(12) United States Patent
Evano et al.

(10) Patent No.: US 11,789,618 B2
(45) Date of Patent: Oct. 17, 2023

(54) METHOD OF VERIFYING A MICROCIRCUIT CARD, METHOD OF PERSONALIZING A MICROCIRCUIT CARD, RELATED MICROCIRCUIT CARD AND ELECTRONIC DEVICE

(71) Applicant: IDEMIA France, Courbevoie (FR)

(72) Inventors: Jean-Michel Evano, Courbevoie (FR); Stéphane Jacquelin, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 0 days.

(21) Appl. No.: 17/406,576

(22) Filed: Aug. 19, 2021

(65) Prior Publication Data

US 2022/0066637 A1   Mar. 3, 2022

(30) Foreign Application Priority Data

Aug. 25, 2020   (FR) ........................... 2008681

(51) Int. Cl.
*G06F 3/06*   (2006.01)
*G06F 21/64*   (2013.01)

(52) U.S. Cl.
CPC ............ *G06F 3/062* (2013.01); *G06F 3/0655* (2013.01); *G06F 3/0679* (2013.01); *G06F 21/64* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16;
(Continued)

(56) References Cited

U.S. PATENT DOCUMENTS 4,682,794 A * 7/1987 Margolin ............. B42D 25/305
283/82
5,819,176 A * 10/1998 Rast ........................ H04W 8/04
455/425
(Continued)

FOREIGN PATENT DOCUMENTS

EP   0 451 024   10/1991
EP   1 727 080   11/2006

OTHER PUBLICATIONS

D. G. Koshy and S. N. Rao, "Evolution of SIM Cards—What's Next?," 2018 International Conference on Advances in Computing, Communications and Informatics (ICACCI), Bangalore, India, 2018, pp. 1963-1967, doi: 10.1109/ICACCI.2018.8554774. (Year: 2018).*
(Continued)

*Primary Examiner* — Daniel C. Chappell
(74) *Attorney, Agent, or Firm* — NIXON & VANDERHYE

(57) ABSTRACT

Disclosed is a microcircuit card includes a module for identification within a mobile telephone network storing a first piece of data, and a memory module storing a second piece of data. wherein the first piece of data and the second piece of data comply with a predetermined rule. Also disclosed is a method for verifying this microcircuit card when the card is housed in an electronic device includes a step of verifying that the first piece of data and the second piece of data comply with a predetermined rule, as well as methods for personalizing the microcircuit card, the microcircuit card, and the electronic device are also described.

14 Claims, 2 Drawing Sheets

(58) Field of Classification Search
CPC ... G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 5,924,045 | A * | 7/1999 | Thauvin | H04W 88/02 455/418 |
| 6,112,276 | A * | 8/2000 | Hunt | G06F 3/061 711/112 |
| 6,824,063 | B1 * | 11/2004 | Wallace | G06K 19/07743 235/487 |
| 9,451,461 | B2 * | 9/2016 | Hartel | H04W 88/06 |
| 2004/0162998 | A1 * | 8/2004 | Tuomi | H04W 12/06 726/3 |
| 2006/0079205 | A1 * | 4/2006 | Semple | H04W 12/108 455/410 |
| 2006/0101288 | A1 * | 5/2006 | Smeets | H04L 9/3234 713/194 |
| 2006/0218396 | A1 * | 9/2006 | Laitinen | H04L 9/3271 713/167 |
| 2007/0253251 | A1 * | 11/2007 | Mizushima | G06Q 20/105 365/185.04 |
| 2008/0295159 | A1 * | 11/2008 | Sentinelli | H04W 12/068 726/6 |
| 2009/0273435 | A1 * | 11/2009 | Ould | G06F 21/88 340/5.2 |
| 2013/0007365 | A1 * | 1/2013 | Varone | G06F 21/316 711/115 |
| 2013/0174264 | A1 * | 7/2013 | Chan | G06F 21/88 726/26 |
| 2016/0007190 | A1 * | 1/2016 | Wane | G06F 9/45533 455/419 |
| 2016/0087957 | A1 * | 3/2016 | Shah | H04L 63/205 726/1 |
| 2018/0189002 | A1 * | 7/2018 | Seo | H04B 1/401 |
| 2018/0367992 | A1 * | 12/2018 | Huber | H04L 67/303 |
| 2020/0228983 | A1 * | 7/2020 | Hoffmann | H04W 12/35 |

OTHER PUBLICATIONS

H.-R. Firoozy-Najafabadi and M.-R. Feizi-Derakhshi, "Multipurpose smart SIM card based on mobile database and location dependent query," 2012 6th International Conference on Application of Information and Communication Technologies (AICT), Tbilisi, Georgia, 2012, pp. 1-5, (Year: 2012).*

French Search Report and Written Opinion, dated Apr. 21, 2021, from corresponding FR application No. 2008681, 7 total pages.

ISO/IEC, excerpt of "ISO7816-3 standard", ISO/IEC CD 7816-3.2, 2004, pp. 13-15 (3 total pages).

ISO/IEC, excerpt of "ISO7816-4 standard", ISO/IEC FCD 7816-4.2, 2003, pp. 58-61 (4 total pages).

* cited by examiner

METHOD OF VERIFYING A MICROCIRCUIT CARD, METHOD OF PERSONALIZING A MICROCIRCUIT CARD, RELATED MICROCIRCUIT CARD AND ELECTRONIC DEVICE

BACKGROUND OF THE INVENTION

Field of the Invention

The present application claims the benefit of French patent application No. 20 08 681 filed Aug. 25, 2020, which is hereby incorporated by reference herein in its entirety.

Description of the Related Art

The present invention relates to the technical field of microcircuit cards.

More specifically, it relates to a method for verifying a microcircuit card accommodated (or housed) in an electronic device, a method for personalizing (or customizing) a microcircuit card, a microcircuit card, and an electronic device configured to accommodate (or house) a microcircuit card.

Mobile telephones generally have two locations for accommodating (or housing) two microcircuit cards. One of these two microcircuit cards comprises a module for identification within a mobile telephone network, usually called a "SIM card." The other of the two cards may optionally comprise either another SIM card or a card comprising a memory module, general a "micro SD" card.

There are known microcircuit cards comprising both a module for identification within a mobile telephone network and a memory module. The use of such cards is advantageous because it makes it possible to diversify the possibilities for using the housing locations of mobile telephones.

SUMMARY OF THE INVENTION

In this context, the invention provides a method for verifying a microcircuit card accommodated (or housed) in an electronic device, the microcircuit card comprising a module for identification within a mobile telephone network storing a first piece of data, and a memory module storing a second piece of data, comprising a step of verifying that the first piece of data and the second piece of data comply with (i.e. follow) a predetermined rule.

In this way, the identification module and the memory module of the microcircuit card are assured of being the ones initially expected on the microcircuit card, and are assured of being properly configured as intended by the designer and/or manufacturer of the microcircuit card.

In practice, the method may comprise a step in which a data frame coming from the identification module is received by the electronic device; said first piece of data can then be located in a defined location in the received data frame.

In addition, the method may comprise a step of reading the second piece of data in a predetermined location of a data table stored in the memory module.

It is also possible to have the method comprise a step of locking the microcircuit card (and/or a step of displaying an error message) if the first piece of data and the second piece of data do not follow the predetermined rule.

For example, in practice the verification may consist in determining whether the first piece of data is equal to the second piece of data.

The first piece of data is stored, for example, in the identification module within a memory area that cannot be modified by the user (in other words, with read-only access for the user).

Furthermore, the second piece of data may be stored in the memory module within a memory area that cannot be modified by the user (in other words, with read-only access for the user).

The invention also provides a method for personalizing (or customizing) a microcircuit card comprising a module for identification within a mobile telephone network, and a memory module, comprising steps of:

retrieving a piece of data stored in the memory module,
recording the retrieved stored piece of data in the identification module.

The retrieved stored piece of data may in practice be recorded in a storage area dedicated to a defined location in a data frame to be transmitted.

The invention also provides a method for personalizing (or customizing) a microcircuit card comprising a module for identification within a mobile telephone network, and a memory module, comprising steps of:

retrieving a piece of data stored in the identification module,
recording of the retrieved stored data in a predetermined location of a data table stored in the memory module.

Furthermore, the invention provides a microcircuit card comprising a module for identification within a mobile telephone network storing a first piece of data, and a memory module storing a second piece of data, wherein the first piece of data and the second piece of data comply with (i.e. follow) a predetermined rule.

According to a conceivable embodiment, the first piece of data and the second piece of data can be identical. As a variant, the first piece of data and the second piece of data verify a particular relationship.

Lastly, the invention provides an electronic device configured to accommodate (or house) a microcircuit card comprising a module for identification within a mobile telephone network storing a first piece of data, and a memory module storing a second piece of data, the electronic device comprising a processor programmed for verifying that the first piece of data and the second piece of data comply with (i.e. follow) a predetermined rule.

The electronic device can thus be equipped with the microcircuit card and can then include the microcircuit card.

This electronic device and/or this microcircuit card can further include certain optional features presented above in terms of method.

Naturally, the various features, variants, and embodiments of the invention can be combined with each other in various combinations to the extent that they are not mutually incompatible or exclusive.

BRIEF DESCRIPTION OF THE DRAWINGS

In addition, various other features of the invention will become apparent from the following description, provided in reference to the drawings, which illustrate non-limiting embodiments of the invention, and in which.

DESCRIPTION OF THE PREFERRED EMBODIMENTS

Figure 1:
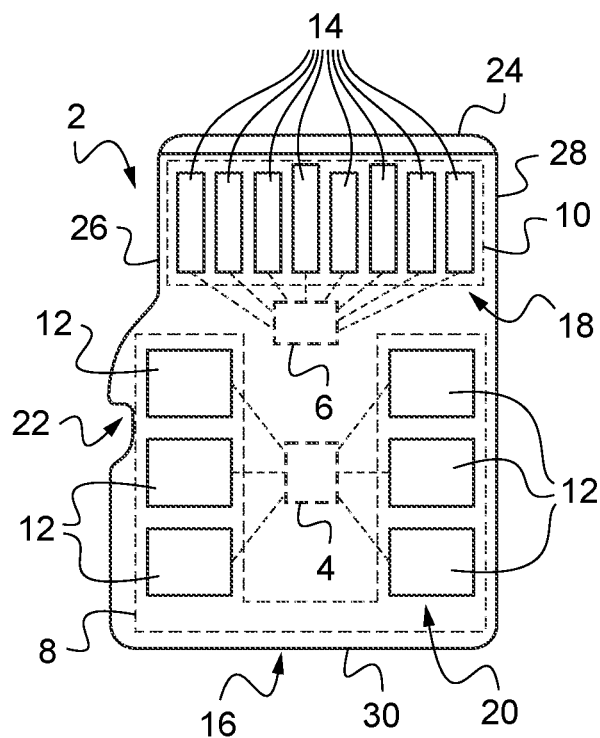
FIG. 1 is a schematic diagram of a microcircuit card according to the invention.

The microcircuit card 2 shown in FIG. 1 comprises a module for identification within a mobile telephone network 4 (or SIM, which stands for "Subscriber Identity Module"), a memory module 6, a first interface 8, and a second interface 10.

These various components are mounted on a substrate 16 (made of plastic material), generally rectangular in shape and described later herein.

The microcircuit card 2 (and therefore in practice the substrate 16) has, for example, a thickness of between 0.5 mm and 0.9 mm (preferably between 0.6 mm and 0.8 mm).

The identification module 4 stores, for example, a cryptographic key used in particular during an authentication process when making a connection in the mobile telephone network in question.

The first interface 8 is designed to make a connection between the identification module 4 and an external electronic device as explained below.

Here, the first interface 8 comprises a plurality of contact pads 12 (here, there are precisely six contact pads 12) flush with the surface of the substrate 16. In the described example, the contact pads 12 are arranged in two rows (in this case, two rows of three contact pads 12 each) spaced apart (typically by more than 2 mm).

Here, the first interface 8 is made in accordance with ETSI standard "*TS 102 221 V15.0.0 Smart Cards; UICC terminal interface; Physical and logical characteristics.*" In this context in particular, each contact pad 12 is between 2 mm and 2.2 mm wide and between 2.3 mm and 2.5 mm long. Furthermore, the above-mentioned spacing between rows may be between 4.6 mm and 5.6 mm.

As shown in FIG. 1, the contact pads 12 in the same row are aligned and two neighboring contact pads 12 in the same row are spaced apart by a distance of between 0.3 mm and 0.6 mm (preferably between 0.4 mm and 0.5 mm).

The identification module 4 is connected to at least some of the contact pads 12 of the first interface 8 so as to be able to make a connection to an external electronic device as mentioned earlier (in practice, this connection is generally to a processor of this external electronic device) and thus exchange data with the external electronic device (that is, in practice, with the processor of the external electronic device).

The second interface 10 is designed to make a connection between the memory module 6 and the external electronic device mentioned earlier, as explained below.

Here, the second interface 10 comprises a plurality of contact pads 14 (precisely eight contact pads 14 in the present case) flush with the surface of the substrate 16. In the described example, the contact pads 14 are aligned along an edge 24 (called front edge 24 hereinafter) of the substrate 16.

Here, the second interface 10 is made in accordance with the "*Physical Layer Specification Ver* 3.0" issued by the "SD Card Association." In this case in particular, two neighboring contact pads 14 are spaced apart, for example, by a distance of between 0.1 mm and 0.5 mm.

The memory module 6 is connected electrically to at least some of the contact pads 14 of the second interface 10 so as to be able to make a connection to an external electronic device as mentioned earlier (in practice, this connection is generally to a processor of this external electronic device) and thus exchange data with the external electronic device (that is, in practice, with the processor of the external electronic device).

The substrate 16 comprises a front area 18 and a back area 20. (The directions of front and back are merely for the sake of clarity of the description; the front corresponds to the areas located toward the top in FIG. 1.)

The front area 18 bears the contact pads 14 of the second interface 10 and ends (toward the front) with the front edge 24. As for the back area 20, it bears the contact pads 12 of the first interface 8.

The substrate 16 has a first lateral edge 26 (on the left in FIG. 1) and a second lateral edge 28 (on the right in FIG. 1) each of which extends from front edge 24 to a back edge 30.

At the front area 18, the substrate 16 has a first width (that is, a first distance between the lateral edges 26 and 28) and, at the back area 20, a second width (that is, a second distance between the lateral edges 26 and 28), the second width here being greater than the first width (in other words: the second distance being greater than the first distance).

In order to comply with the aforementioned specification, in particular, the first width (or first distance) is, for example, between 9 mm and 10.4 mm and/or the second width (or second distance) is, for example, between 10.5 mm and 11.5 mm. As for the length of substrate 16 (that is, the distance between the front edge 24 and the back edge 30), in this case it is, for example, between 14.5 mm and 15.5 mm As can be seen in FIG. 1, the second lateral edge 28 is straight (or rectilinear). As for the first lateral edge 26, it comprises a first straight part at the front area 18, a second straight part in the back area 20, and an elbowed part between the first straight part and the second straight part.

Here, the first lateral edge 26 furthermore defines a recess 22 (formed in practice by a hollow in the aforementioned second straight part) at the back area 20.

Figure 2:
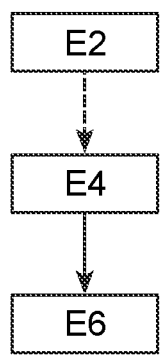
FIG. 2 is a logic diagram showing a first conceivable method for personalizing the microcircuit card of FIG. 1.

FIG. 2 shows, in the form of a logic diagram, a first conceivable method for personalizing (or customizing) the microcircuit card 2.

According to this method, the memory module 6 is personalized (or customized) in advance in step E2. This step E2 is performed, for example, by means of an electronic device of the manufacturer of the memory module 6, this electronic device being in communication with the memory module 6 via the second interface 10 described above.

During this step E2, data that will subsequently be usable for the operation of the memory module 6 are therefore written to the memory module 6. In particular, a piece of data referred to hereinafter as "verification data" is written to a predetermined location (or space) in a data table. In practice, this location can be located in a memory area that cannot be modified by the user (that is, read-only access for the user).

In the exampled described here, the predetermined location is a dedicated location (or space) for the serial number (PSN field) in the card identification table (CID table, CID standing for "Card Identification"). As an example, the piece of verification data written (in step E2) to this location is the string of bytes (in this case a string of four bytes): 64411931h (h indicating a hexadecimal notation).

As for subsequent steps E4 and E6 described below, they are implemented later during the personalization (or customization) of identification module 4 by means of a dedicated electronic device (for example, a personalization machine), generally separate from the manufacturer's electronic device mentioned earlier.

This dedicated electronic device is in communication with memory module 6 by means of the second interface 10, and in communication with the identification module 4 by means of the first interface 8.

The method of FIG. 2 then comprises a step E4 of retrieving the piece of verification data stored in the memory module 6, in this case by reading this verification data in the predetermined location of the above-mentioned data table (this reading is done by the dedicated electronic device in charge of personalizing the identification module 4). The read piece of data here is: 64411931h, as indicated earlier.

The method of FIG. 2 then comprises a step E6 of recording (that is, writing) the piece of verification data retrieved in step E4 to the identification module 4, this recording being done in a storage area dedicated to a defined location (e.g. a defined field) in a data frame to be transmitted.

In the example described here, this storage area is the one that stores, in the identification module 4, the pre-issuing data contained in the historical bytes of the answer to reset (or ATR) supplied by identification module 4 according to standard ISO 7816.

In practice, this storage location can, in practice, be located in a memory area that cannot be modified by the user (that is, read-only access for the user).

Figure 3:
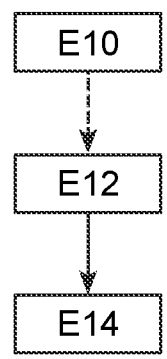
FIG. 3 is a logic diagram showing a second conceivable method for personalizing the microcircuit card of FIG. 1.

FIG. 3 shows, in the form of a logic diagram, a second conceivable method for personalizing (or customizing) the microcircuit card 2.

According to this method, identification module 4 is personalized in advance in a step E10, for example by a personalization machine of the manufacturer of the identification module 4 or a personalization machine operated on behalf of the telephone network operator (the telephone network operator managing the mobile telephone network associated with the identification module 4).

This personalization machine is then in communication with the identification module 4 via the first interface 8.

During this step E10, data that will subsequently be usable for the operation of the identification module 4 are therefore written to the identification module 4. In particular, a piece of data referred to hereinafter as "verification data" is written to a storage area dedicated to a location defined in a data frame to be transmitted. In practice, this storage location can, in practice, be located in a memory area that cannot be modified by the user (that is, read-only access for the user).

In the example described here, this storage area is the one that stores, in the identification module 4, the pre-issuing data contained in the historical bytes of the answer to reset (or ATR) supplied by identification module 4 according to standard ISO 7816.

As an example, the following four bytes are stored during this step E10: 64411931h as the first (four) bytes of the pre-issuing data. Here, the first byte of these four bytes, having a value of 64h in this case, corresponds in addition to the tag 6h indicative of pre-issuing data, and to the length 4h of the pre-issuing data, in accordance with standard ISO 7816.

As for subsequent steps E12 and E14 described below, they are implemented later during the personalization of the memory module 6 by means of a dedicated electronic device, generally separate from the personalization machine mentioned earlier.

This dedicated electronic device is in communication with memory module 6 by means of the second interface 10, and in communication with the identification module 4 by means of the first interface 8.

The method of FIG. 3 then comprises a step E12 of retrieving the piece of verification data stored in identification module 4.

In the example described here, this step E12 is performed (by means of the dedicated electronic device) by resetting the identification module 4, receiving a data frame (here, the answer to reset) issued by the identification module 4, and extracting the piece of verification data from this data frame (this piece of verification data being located in a defined location of the data frame, this location being, in this case, that of the pre-issuing data contained in the historical bytes of the answer to reset, precisely that of the first four bytes of the pre-issuing data).

The retrieved (extracted) bytes here are the following bytes: 64411931h.

The method of FIG. 3 then comprises a recording (i.e. writing) step E14 for recording the piece of verification data in a predetermined location of a data table stored in the memory module 4. In practice, this location can be located in a memory area that cannot be modified by the user (that is, read-only access for the user).

In the exampled described here, the predetermined location is a dedicated location (or space) for the serial number (PSN field) in the card identification table (CID table, CID standing for "Card Identification"). According to the aforementioned example, the piece of verification data recorded in this location is the string of bytes: 64411931h.

The method of FIG. 2 and the method of FIG. 3 thus allow microcircuit card 2 to store the same piece of verification data:
- in the identification module 4, in the storage area dedicated to the location (e.g. field) defined in the data frame to be transmitted by identification module 4;
- in the predetermined location (or space) of the data table stored in the memory module 6.

As a variant, a first piece of verification data stored in said storage area of the identification module 4 and a second piece of verification data stored in the predetermined location of the data table stored in memory module 6 can be different but comply with a predetermined rule. As an example, such a predetermined rule could specify that the combination by exclusive OR (or XOR) of the first piece of data and the second piece of data is zero.

Figure 4:
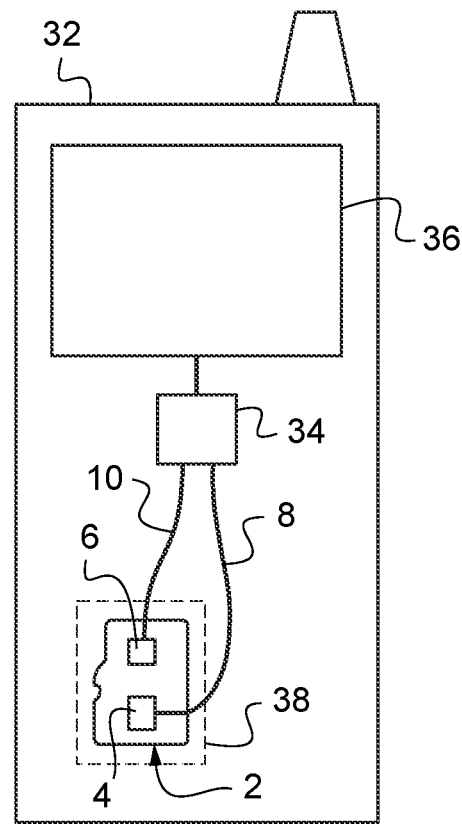
FIG. 4 shows a schematic diagram of an electronic device equipped with the microcircuit card of FIG. 1.

FIG. 4 shows a schematic diagram of an electronic device 32 equipped with the microcircuit card 2.

Here, this electronic device 32 is a multifunction mobile terminal (sometimes referred to as a "smartphone"). However, as a variant, it could be another type of electronic device, for example a telematics module of a motor vehicle.

The electronic device 32 comprises a processor 34, a user interface 36 (here a screen, such as a touchscreen), and a card reader 38.

The card reader 38 comprises a housing designed to accommodate the microcircuit card 2, and contact terminals (not shown) designed to cooperate with, on the one hand, the contact pads 12 of the first interface 8 and, on the other hand, the contact pads 14 of the second interface 10.

These contact terminals make it possible to make separate electrical connections from the first interface 8 and from the second interface 10 to the processor 34.

Thus, when the microcircuit card 2 is accommodated (or housed) in the card reader 38, the processor 34 can exchange data with the identification module 4 via the first interface 8 and, independently, with the memory module 6 via the second interface 10.

The processor 34 is in addition connected to the user interface 36 and in particular can control the display of messages intended for the user on this user interface 36 (in this case, on the screen mentioned earlier).

Figure 5:
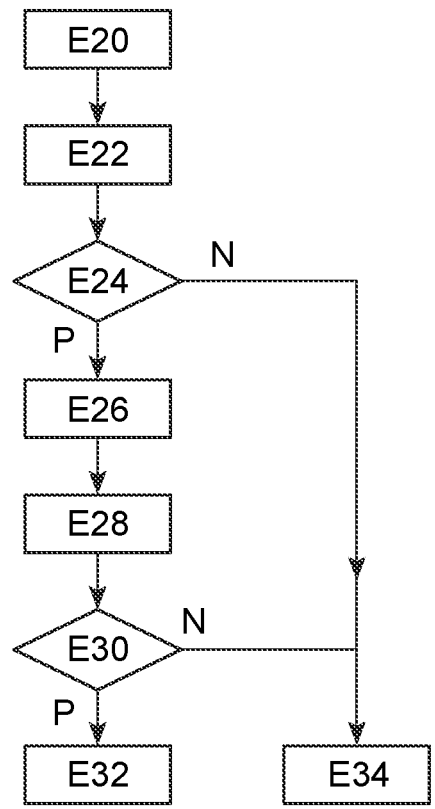
FIG. 5 is a logic diagram showing a method for verifying a microcircuit card according to the invention.

FIG. 5 gives an example of a method for verifying the microcircuit card 2 by the electronic device 32.

This method starts with a step E20 for resetting the identification module 4 by the processor 34. As already indicated, in this case the identification module 4 complies with standard ISO 7816 and resetting of the identification module 4 here is performed by the processor 34 applying a predefined voltage to contact pad RST of the first interface 8.

The electronic device 32 (specifically the processor 34 thereof in the present case) then receives in step E22 a data frame (here, the ATR or Answer To Reset called for by standard ISO 7816) coming from the identification module 4.

For example, this answer to reset has the following form (in hexadecimal):

3B 9F 96 80 1F C6 80 31E0 73FE211B 6441193100 829000 A9.

In the example described here, the processor 34 first verifies that the first byte of the historical bytes of the answer to reset is indeed equal to 80h (step E24), that is, the answer to reset is indeed in the expected format (that will make it possible to extract the first piece of data as explained below).

In not (arrow N in FIG. 5), the method proceeds to error processing step E34 described below.

If the verification of step E24 is positive (which is the case in the answer-to-reset example given above), the method proceeds (following arrow P in FIG. 5) with a step E26 in which the processor 34 extracts a first piece of data located in a location defined in the received data frame (e.g. in a defined field of the received data frame). Here, the first extracted piece of data corresponds to the first four bytes in the pre-issuing data of the answer to reset.

In the answer-to-reset example given above, the pre-issuing data are signaled by byte 64h (which in addition indicates a length of four bytes for these pre-issuing data). In this case, the processor 34 extracts the following bytes as first data: 64411931h (four bytes including signaling byte 64h).

The processor 34 then proceeds, in step E28, with reading of a second piece of data in a predetermined location of a data table stored in the memory module 6. Here, this data table is the card identification table (CID, standing for "Card Identification") and/or the predetermined location is the location dedicated to the serial number (PSN field).

As described earlier, the second piece of data here is: 64411931h.

The processor 34 can then proceed to a step E30 of verifying that the first piece of data and the second piece of data comply (i.e. follow) with a predetermined rule.

Here, the verification consists in determining whether the first piece of data is equal to the second piece of data (which is indeed the case in the example above). As a variant, another relationship between the first piece of data and the second piece of data could be verified. As already indicated, the combination by exclusive OR of the first piece of data and the second piece of data could, for example, be verified to be zero.

In the event of positive verification (arrow P in FIG. 5), the operation of the electronic device 32 can proceed normally to step E32. This normal operation includes, for example, a continuation of the reset phase and/or any step of turning on the operation of the electronic device 32.

However, if verification step E30 fails (arrow N in FIG. 5), the processor 34 implements an error processing step E34. Indeed, in this case the microcircuit card is considered not to have been produced according to the expected production and personalization process, and this can, in certain cases, result in a risk for the operation of the electronic device 32.

The error processing step E34 comprises, for example (as controlled by processor 34), the display of an error message on the user interface 36.

The error processing step E34 can also include (as controlled by processor 34) locking of the microcircuit card 2.

In practice, this locking may include locking the operation (for example, through an absence of electrical power supply) of the identification module 4 and/or locking of the operation (for example, through an absence of electrical power supply) of the memory module 6.

Other types of locking can be considered as a supplement or as a variant:
- locking of the electronic device 32 until the microcircuit card 2 is removed from the card reader 38;
- locking of the terminal (even if microcircuit card 2 is removed from the card reader 38);
- locking of access to the telephone network associated with the identification module 4 or locking of access to any telephone network;
- storing of the prohibition against using the identification module 4 in the electronic device 32;
- temporary locking of all the card readers.

Naturally, various other modifications may be made to the invention within the context of the enclosed claims.

The invention claimed is:

1. A method of verifying a microcircuit card accommodated in an electronic device, the microcircuit card equipped with a memory module and an identification module for identification within a mobile telephone network, the identification module storing a first piece of data, and the memory module storing a second piece of data, the method comprising:
   a verification step of verifying that the first piece of data and the second piece of data comply with a predetermined rule;
   a step of resetting the identification module; and
   a receiving step of receiving an answer to reset from the identification module by the electronic device, said first piece of data being located in a defined location in the received answer to reset.

2. The verification method according to claim 1, further comprising:
   a step of determining whether the first piece of data and the second piece of data do not comply with the predetermined rule; and
   determining that the first piece of data and the second piece of data do not comply with the predetermined rule, and subsequently locking the microcircuit card.

3. The verification method according to claim 1, further comprising:
   a reading step of reading the second piece of data in a predetermined location of a card identification table stored in the memory module.

4. The verification method according to claim 3, further comprising:
   a step of determining whether the first piece of data and the second piece of data do not comply with the predetermined rule; and
   determining that the first piece of data and the second piece of data do not comply with the predetermined rule, and subsequently locking the microcircuit card.

5. The verification method according to claim 3, wherein the verification consists in determining whether the first piece of data is equal to the second piece of data.

6. A method of verifying a microcircuit card accommodated in an electronic device, the microcircuit card equipped with a memory module and an identification module for identification within a mobile telephone network, the identification module storing a first piece of data, and the memory module storing a second piece of data, the method comprising:
 a verification step of verifying that the first piece of data and the second piece of data comply with a predetermined rule;
 a step of determining whether the first piece of data and the second piece of data do not comply with the predetermined rule; and
 determining that the first piece of data and the second piece of data do not comply with the predetermined rule, and subsequently locking the microcircuit card.

7. The verification method according to claim 6, wherein the verification consists in determining whether the first piece of data is equal to the second piece of data.

8. The verification method according to claim 1, wherein the verification consists in determining whether the first piece of data is equal to the second piece of data.

9. The verification method according to claim 8, further comprising:
 a step of determining whether the first piece of data and the second piece of data do not comply with the predetermined rule; and
 determining that the first piece of data and the second piece of data do not comply with the predetermined rule, and subsequently locking the microcircuit card.

10. A method of personalizing a microcircuit card that is equipped with a memory module and an identification module for identification within a mobile telephone network, comprising steps of:
 retrieving a piece of data stored in the memory module in a predetermined location in a card identification table; and
 recording said piece of data into a storage area of the identification module storing pre-issuing data contained in historical bytes of an answer to reset.

11. The method according to claim 10, wherein said piece of data is recorded in a storage area dedicated to a defined location in a data frame to be transmitted.

12. A method for personalizing a microcircuit card that is equipped with a memory module and an identification module for identification within a mobile telephone network, comprising steps of:
 resetting the identification module;
 receiving a data frame issued by the identification module;
 extracting a piece of data from the received data frame; and
 recording the extracted piece of data in a predetermined location of a data table stored in the memory module.

13. An electronic device configured to house a microcircuit card equipped with a memory module and an identification module for identification within a mobile telephone network, the identification module storing a first piece of data, and the memory module storing a second piece of data, the electronic device comprising:
 a processor programmed for verifying that the first piece of data and the second piece of data comply with a predetermined rule,
 wherein the electronic device is configured to reset the identification module and to receive an answer to reset from the identification module, said first piece of data being located in a defined location in the received answer to reset.

14. The electronic device according to claim 13, wherein the processor is programmed for reading the second piece of data in a predetermined location of a card identification table stored in the memory module.

* * * * *